Oct. 5, 1965  W. R. CARLSEN  3,209,430
CUTTING TOOL
Filed May 31, 1963  2 Sheets-Sheet 1
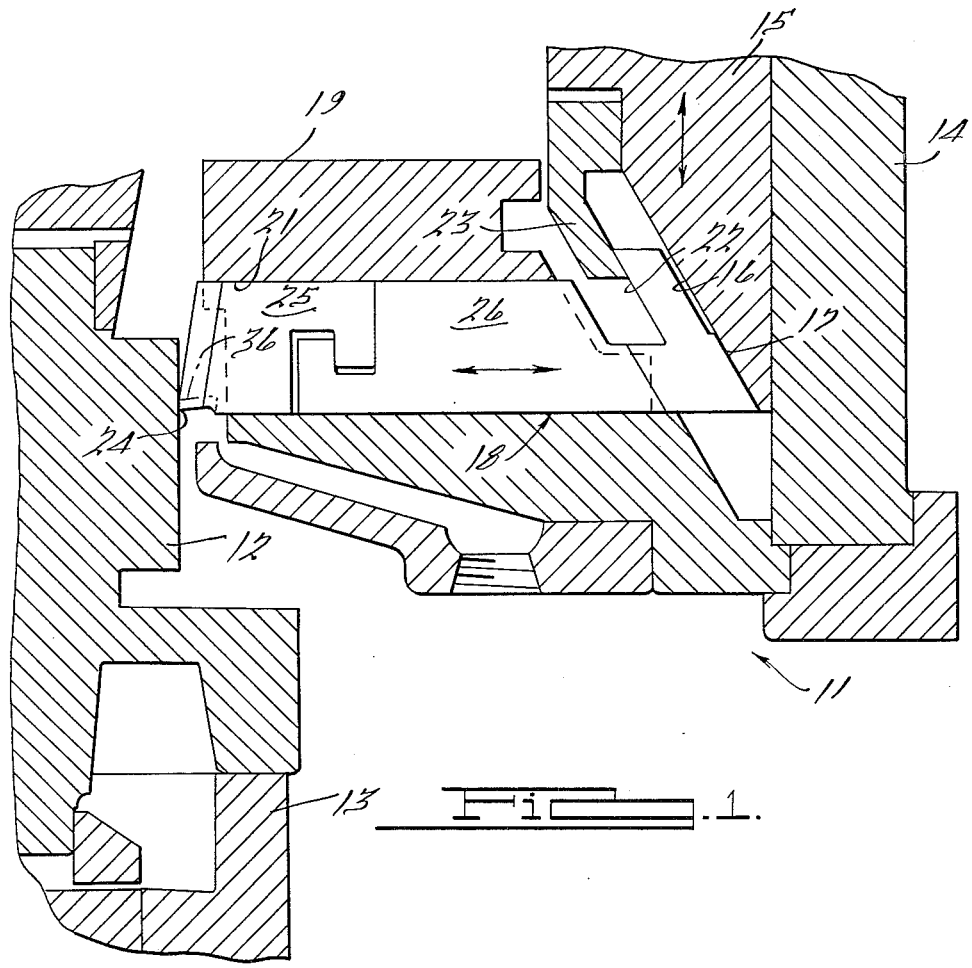
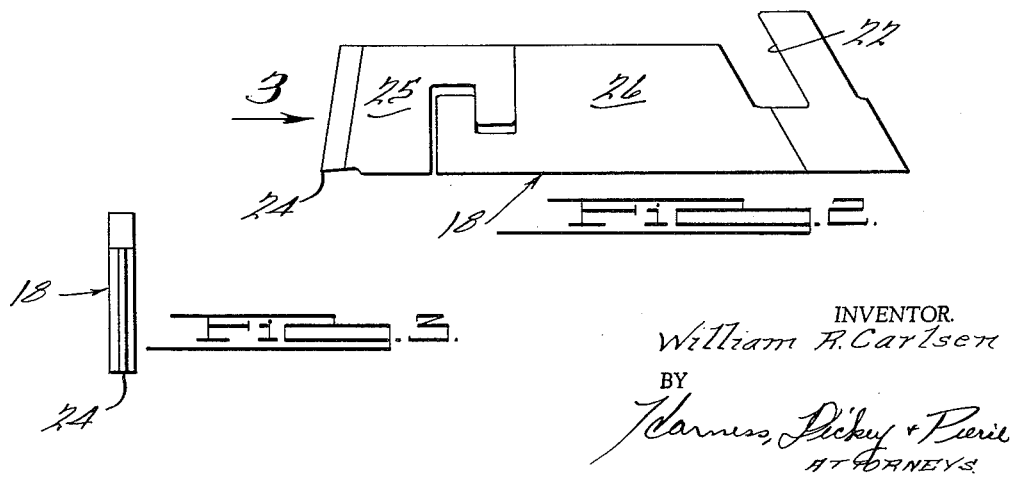
INVENTOR.
William R. Carlsen
BY
Harness, Dickey & Pierce
ATTORNEYS

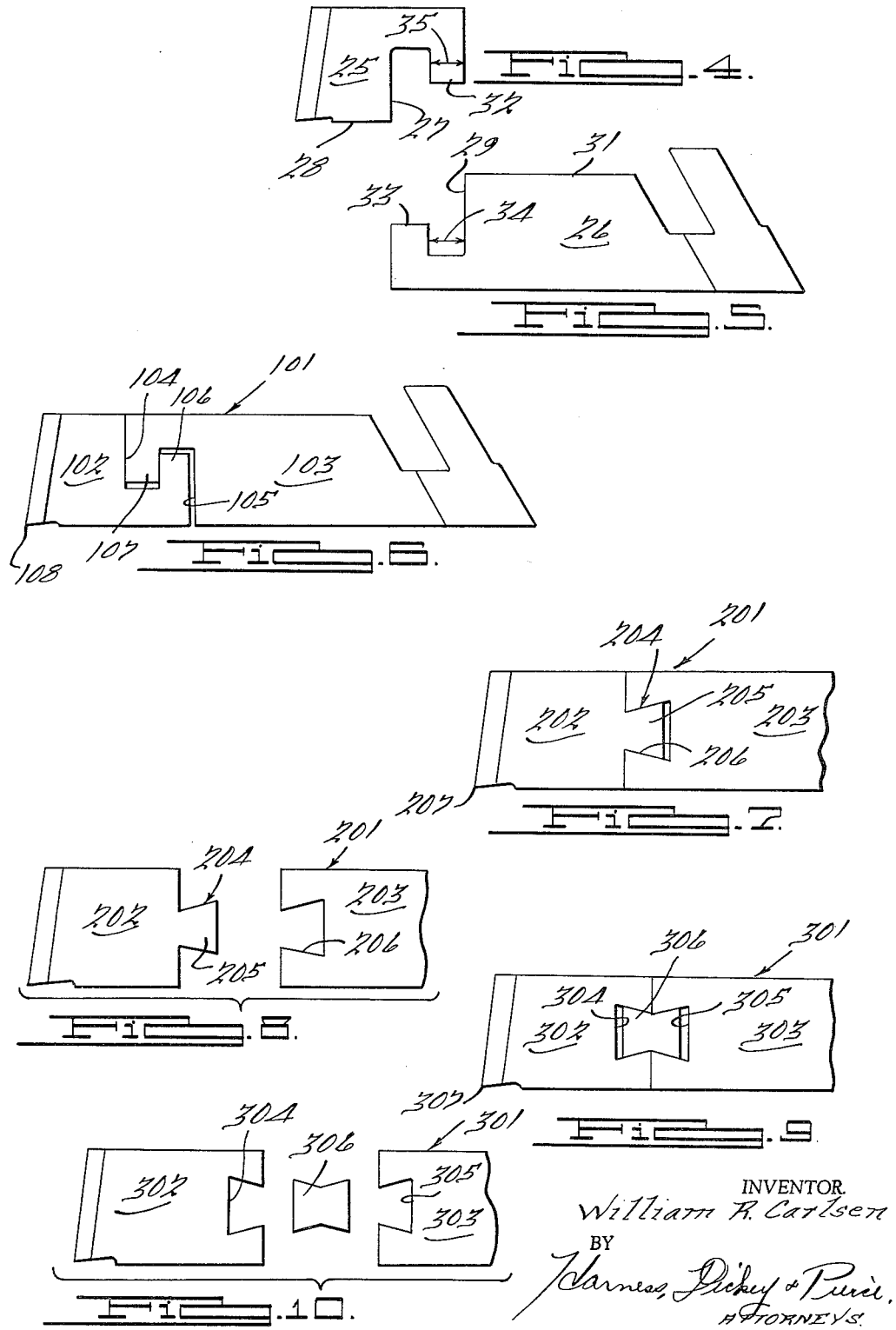

United States Patent Office 3,209,430
Patented Oct. 5, 1965

3,209,430
CUTTING TOOL
William R. Carlsen, Huntington Woods, Mich., assignor to Michigan Tool Company, Detroit, Mich., a corporation of Delaware
Filed May 31, 1963, Ser. No. 284,530
1 Claim. (Cl. 29—95)

This invention relates to cutting tools, and more particularly to tools used in gear shaping operations.

The cutting tools used for simultaneously shaping all teeth of a gear workpiece, such as those employed in machines of the type shown in Patent No. 2,346,867, dated April 18, 1944, are of relatively large size and fabricated of expensive metal. They must be reground or replaced when worn, and exchanged for different tools to suit the desired workpiece profile or material.

It is an object of the present invention to provide a novel and improved cutting tool construction which will greatly decrease the cost of interchanging or replacing the tools, while not detracting from their efficacy during operation.

It is another object to provide an improved cutting tool construction of this nature which is usable with known types of gear shaping machines such as that shown and described in the aforementioned patent.

Other objects, features, and advantages of the present invention will become apparent from the subsequent description, taken in conjunction with the accompanying drawings.

In the drawings:

FIGURE 1 is a partially schematic cross-sectional view in elevation of a portion of a gear shaping machine showing a preferred form of the cutting tool of this invention mounted therein;

FIGURE 2 is a side elevational view of the cutting tool in assembled position;

FIGURE 3 is an end elevational view thereof taken in the direction of the arrow 3 of FIGURE 2;

FIGURE 4 is a side elevational view of the cutting section of the tool;

FIGURE 5 is a side elevational view of the retaining section of the tool;

FIGURE 6 is a side elevational view of a modified form of the cutting tool shown in assembled position.

FIGURE 7 is a fragmentary side elevational view of still another embodiment of the cutting tool shown in assembled position;

FIGURE 8 is a view of embodiment of FIGURE 8 but in the disassembled position;

FIGURE 9 is a fragmentary side elevational view of still another embodiment of the invention shown in assembled position, and FIGURE 10 is a view of the FIGURE 9 embodiment in disassembled position.

In general terms, each of the illustrated embodiments of the invention comprises a flat elongated cutting tool adapted to be mounted in a slotted head for a gear shaving machine such as is shown in the aforementioned patent. The tool is made up of two sections, a retaining section which is adapted to coact with the feed cones in the machine retainer housing, and a cutting section which carries the cutting edge and is interfitted with the retaining section. The connection between the two tool sections is such as to cause the cutting section to follow the movement of the retaining section while at the same time permitting force components on the cutting section along the tool to be transmitted to the retaining section in a manner which will minimize stress concentrations and contribute to tool life. When it is desired to regrind the cutting edge, or to change its shape or material, it is only necessary to detach the cutting section from the retaining section of the tool, which may be done by simple manual manipulation, and replace it with another cutting section having the proper characteristics. In this manner, the retaining section, which has a major portion of the total metal of the cutting tool, may remain in position, and only a stock of cutting sections need be provided. The cross-sectional shape of the interchangeable cutting sections adapted for use with any particular retaining section will all be the same as cross-sectional shape of the retaining section, and their connecting portions attachable to the retaining section will be of identical configuration.

In a preferred form of the invention, the connecting portions of the two cutting tool sections comprise oppositely extending L-shaped recesses in the sections forming interfitting fingers, two adjacent surfaces of the sections being in contact so that force components exerted on the cutting edge in the direction of extent of the tool will be transmitted from the cutting section to the retaining section. In another form, a dovetail type of connection is used, and in still another form, two aligned dovetail slots are provided in the sections, with a separate key being retained by the slots.

Referring more particularly to the drawings, FIGURE 1 illustrates a portion of a gear shaping machine generally indicated at 11, which is like that shown in the aforementioned patent and is used for simultaneously shaping the interstices between all the teeth on a gear workpiece 12 held by a work holder 13. A retainer housing 14 is mounted above holder 13 and slidably supports a feed cone 15 for vertical movement, cone 15 having a surface 16 for coaction with the inclined surfaces 17 of a plurality of circumferentially spaced cutting tools, each tool being generally indicated at 18.

Tools 18 are radially arranged in a slotted head or tool guide 19, the guide having slots 21 within which the tools are slidably supported. The outer ends of the tools have recessed portions with inclined surfaces 22, these surfaces being cooperable with an inner cone 23 secured to outer cone 15. The inner ends of the cutting tools have cutting edges 24 facing the lower narrow tool edges and simultaneously engageable with workpiece 12.

In operation of the apparatus thus far described, work holder 13 and its workpiece 12 will be continually reciprocated in a vertical direction. During each upstroke, tool 18 will be so positioned as to cause cutting edges 24 to shave material from the interstices between the workpiece teeth to be formed. After each upstroke, cone 15 will be moved upwardly, causing cutting tools 18 to be retracted, the cutting tool shown in FIGURE 1 being retracted to the right, so that the work holder downstroke may be effected without contact between the tools and workpiece. After each downstroke of the work holder, cone 15 will be fed downwardly, shifting tools 18 radially inwardly in preparation for the next cutting stroke or upstroke of workpiece 12.

The construction of each cutting tool 18 is seen in detail in FIGURES 2, 3, 4 and 5. Each cutting tool comprises a cutting section 25 and a retaining section 26. The two sections are of flat shape and their main portions of equal thickness, and height, such that slot 21 within which the tool slides will fully support both sections of the tool against lateral movement vertically or horizontally.

Means are provided for interconnecting sections 25 and 26. This means includes a recess 27 extending upwardly from the bottom edge 28 of section 25, and a recess 29 extending downwardly from the top edge 31 of section 26. Recesses 27 and 29 are formed in the adjacent portions of sections 25 and 26 and are of L-shaped configurations. That is, the two recesses will form a downwardly directed finger 32 on section 25 and an upwardly directed finger 33 on section 26.

The size 34 of the vertical portion of recess 29 is equal to the size 35 of finger 32, so that finger 32 will fit snugly in recess 29. The size of finger 33 however is slightly smaller than the size of recess 27, so that there will be no interference on these surfaces. The length of finger 32 is also slightly less than the vertical length of recess 29. The size differences are exaggerated in the drawing for purposes of clarity, and will actually be only a few thousandths of an inch.

To assemble sections 25 and 26, it will merely be necessary to manually slip fingers 32 and 33 into the corresponding recesses as shown in FIGURE 2. The entire tool may then be assembled into slot 21. During operation, any forces transmitted from cutting edge 24 upwardly and to the right in FIGURE 1, will be transmitted directly through the engaging surfaces of the two sections to retaining section 18.

Should it be desired to regrind cutting edge 24, it is only necessary to remove section 25 for this purpose, and after this is done, it may still be replaced and re-used, functioning the same as before. If it is desired to shape a gear having a different tooth profile, a cutting section having the same main cross-sectional shape as cutting section 25 but a different profile of edge 24 may be used. Of course, the portions of the new cutting section which interfit with retaining section 26 will be shaped identically with the corresponding portions of cutting section 25.

The same will be true if it is desired to replace cutting section 25 with a section of different material to suit a particular workpiece.

It should be noted that even after cutting edge 24 has been sharpened, for example, along the dot-dash line indicated at 36 in FIGURE 1, cutting tool 18 will still be effective, and the horizontal components of forces on the cutting edge will still be directly transmitted from cutting section 25 to retaining section 26 through the engaging vertical surfaces of section 25 and recess 29 of section 26.

FIGURE 6 illustrates a modified form of the invention which is basically the same as that of FIGURES 1 to 5 but in which the directions of extent of fingers are reversed. The cutting tool is generally indicated at 101 and has a cutting section 102 and a retaining section 103. Cutting section 102 has an L-shaped recess 104 in its upper portion, section 103 having an L-shaped recess 105 in its lower portion with the recesses forming fingers 106 and 107 on sections 102 and 103 respectively. Finger 107 fits snugly in the vertical portion of recess 104, the vertical portion of recess 105 being slightly wider than finger 106. In this manner, the horizontal components of forces on cutting edge 108 of cutting section 102 will be transmitted directly through the forward vertical wall of recess 104 to the engaging forward surface of section 103. As in the previous embodiment, section 102 may be replaced merely by slipping it off section 103.

FIGURES 7 and 8 illustrate a further embodiment of the invention generally indicated at 201, the tool having a cutting section 202 and a retaining section 203. The cutting portion of cutting section 202 and the rear portion (not shown) of section 103 are the same as in the previous embodiments. The interconnecting means is generally indicated at 204 and comprises a dovetail projection 205 at the rear end of section 202, and a corresponding dovtail recess 206 in the forward end of section 203. The rear end of recess 206 is spaced slightly rearwardly from the rear end of projection 205, so that there will be no interference with full engagement of the forward end of section 203 with the rear end of section 202 above and below projection 205. Here again, the horizontal components of forces on cutting edge 207 will be transmitted directly to section 203. Section 202 may be replaced by merely slipping it off section 203.

FIGURES 9 and 10 illustrate a still further embodiment of the invention generally indicated at 301, this embodiment having a cutting section 302 and a retaining section 303. The forward end of section 302 and the rear end (not shown) of section 303 are formed as in the previous embodiment. Section 302 is provided with a dovetail recess 304, while section 303 is provided with a dovetail recess 305. The adjacent ends of these recesses are in alignment, and a key 306 is provided which will snugly interfit with recesses 304 and 305, as seen in FIGURE 9. The inner ends of recesses 304 and 305 respectively are slightly spaced from the adjacent ends of key 306, so that the key may hold the facing vertical surfaces of sections 302 and 303 in engaging relation. The horizontal components of forces acting on cutting edge 307 of section 302 will therefore be transmitted directly to section 303. As in the previous embodiment, section 302 may be replaced merely by slipping it off key 306.

It should be noted that in all embodiments of the invention, horizontal shifting forces exerted in opposite directions along the cutting tool by the tool shifting means will be transmitted from the retaining section to the cutting section, since in all cases the connecting portions of these sections have surfaces which prevent play between these sections in the direction of extent of the tool.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

A blade-like cutting tool for shaping operations, comprising a cutting section and a retaining section in aligned relation and having main portions of identical cross-sectional shape with two oppositely disposed narrow tool edges, a cutting edge at the forward end of said cutting section facing one of the narrow tool edges, means at the rear end of said retaining section for coaction with cutting tool shifting means, and interconnecting portions on the adjacent ends of said cutting and retaining sections, said interconnecting portions comprising L-shaped recesses in said cutting and retaining sections forming oppositely extending fingers on said sections with parallel edges at right angles to said narrow tool edges, each finger being adapted to fit into the recess of the other section, the finger extending inwardly from the tool edge opposite that which the cutting edge faces having a snug fit, whereby the components of forces on said cutting edge in the direction of extent of said tool will be effectively transmitted from said cutting section to said retaining section, the other finger having a looser fit, the ends of the fingers being relieved with respect to the inner ends of the recesses within which they are disposed, the fit of said portions being such that the cutting section may be removed from the retaining section by manual manipulation, the surfaces of said portions being so related as to prevent relative shifting of the cutting and retaining sections in the direction of extent of the tool.

References Cited by the Examiner

UNITED STATES PATENTS

| | | | |
|---|---|---|---|
| 390,034 | 9/88 | Peckover | 29—105 |
| 442,259 | 12/90 | Reed | 29—96 |
| 542,378 | 7/95 | Shuster | 29—105 |
| 1,700,610 | 1/29 | Dress | 29—96 |
| 2,374,890 | 5/45 | Pelphrey | 29—95 |
| 2,710,442 | 6/55 | Ranons | 29—96 |
| 2,924,872 | 2/60 | Wildhaber | 29—95 |

FOREIGN PATENTS

| | | |
|---|---|---|
| 197,981 | 5/08 | Germany. |
| 326,148 | 9/20 | Germany. |

WILLIAM W. DYER, Jr., *Primary Examiner.*